INVENTOR.
Elvin E. Hoskins
BY Reginald W. Hoagland
ATTORNEY

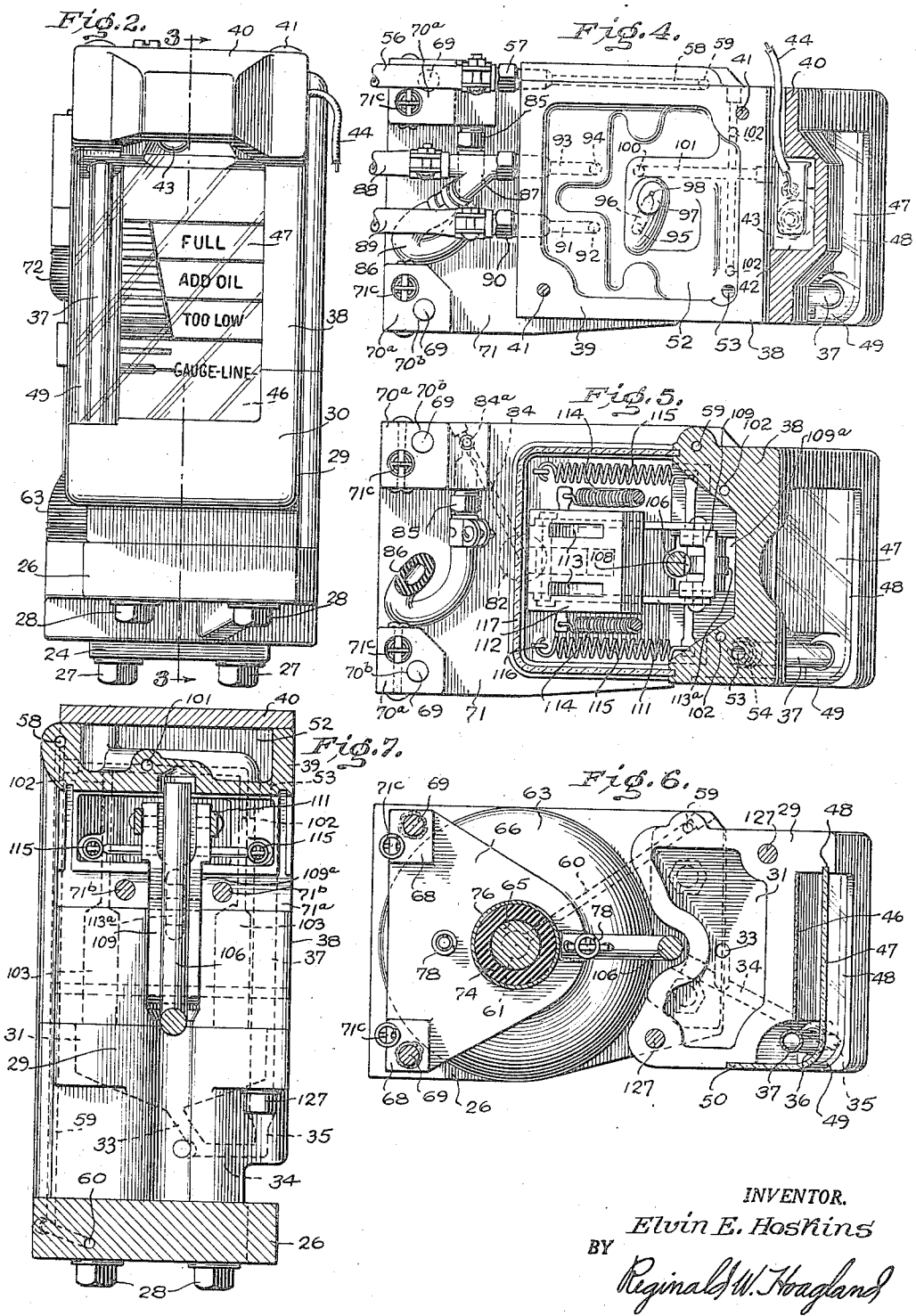

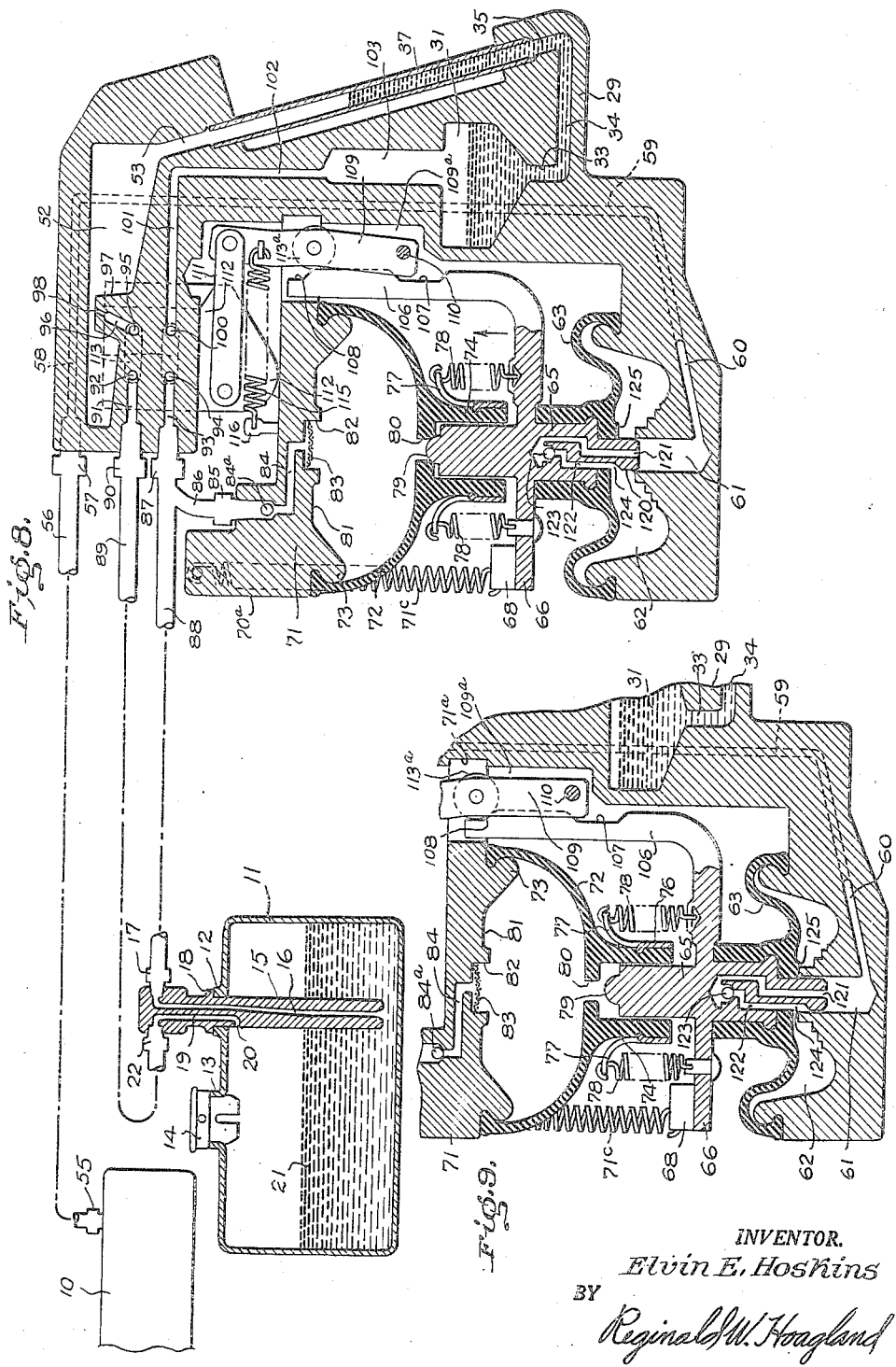

United States Patent Office 2,761,316
Patented Sept. 4, 1956

2,761,316

LIQUID LEVEL INDICATING GAUGE

Elvin E. Hoskins, Flint, Mich.

Application January 5, 1954, Serial No. 402,223

9 Claims. (Cl. 73—302)

This invention relates to a liquid level indicating gauge, and it consists in the combinations, constructions, and arrangements of parts herein described and claimed.

The present invention comprises novel and useful improvements in liquid level indicating gauges and more specifically, pertains to an instrument for accurately indicating the depths of liquids in containers or receptacles by means of the hydrostatic head of the liquid level as, for example, the level of the lubricant contained in the crankcase of an automobile engine. Further, it constitutes an improvement over my former Patent No. 2,653,477.

It is an object of the present invention to provide an improved gauge for automatically and accurately indicating by means of a hydrostatic head, the level of liquids such as that of oil in the crankcase of an automobile engine, for a period of time upon the stopping of the engine.

Another object of the invention is to provide a device of the character set forth which may be attached to an automobile with a minimum of effort and with a minimum alteration of the conventional parts of such automobile.

A further object of the invention is to provide, in a device of the character set forth, novel means for moving a column of liquid in a tube forming a part of the invention whereby the same may be read with an associated scale likewise forming a part of the invention.

A further object of the invention is to provide, in a device of the character set forth, novel valves and operating mechanisms therefor forming a part of the invention.

A further object of the invention is to provide a novel and improved air compressing system for supplying pressure on two bodies of liquids to indicate the level of one by the visible height of the other.

A further object of the invention is to provide, in a device of the above-indicated character, a novel venting mechanism that relieves all pressures on both sides of a level indicating liquid prior to and directly after expiration of a level reading time.

It is also an object of the invention to provide, in a device of the above-indicated character, a vacuum chamber and valve arrangement that not only sets movable parts of the device in position for operation, but also utilizes the vacuum in the chamber while set to stabilize movement of parts against operation upon sudden diminishing and restoring of the vacuum leading to the chamber.

Other and further objects of the invention will become apparent from a reading of the following specification taken in conjunction with the drawings, in which:

Figure 2 is a front elevational view thereof;

Figure 4 is a sectional view along line 4—4 of Figure 1;

Figure 5 is a sectional view along line 5—5 of Figure 1;

Figure 6 is a sectional view along line 6—6 of Figure 1;

Figure 7 is a sectional view along line 7—7 of Figure 1;

Figure 8 is a schematic view illustrating the operation of the present invention and showing the same effectively as it would appear with an engine with which it is associated at the time of the shutting off of such engine; and Figure 9 is a fragmentary view similar to Figure 8, but showing the device as it effectively would appear during the operation of such engine.

Figure 1:
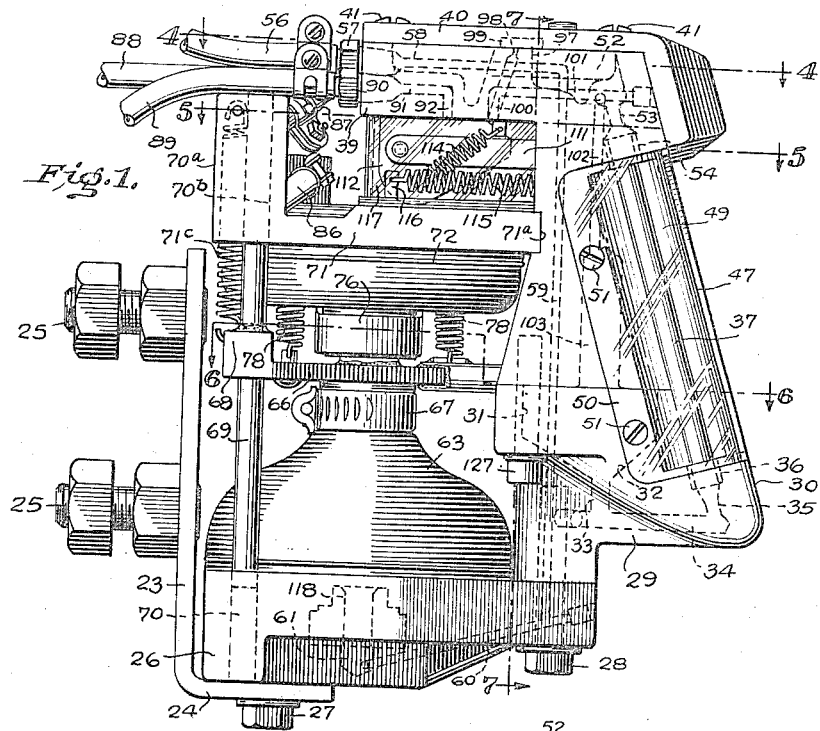
Figure 1 is a side elevational view of an embodiment of the invention.

Referring more particularly to the drawings, there is shown in Figure 8, an intake manifold 10 of an automobile engine (not shown) which engine is provided with a crankcase represented at 11 and provided with conventional bosses 12 and 13 for receiving, respectively, the conventional oil gauge stick by means of which the fluid level of the lubricant in the crankcase 11 may be manually gauged, and the conventional oil filler cap 14 with breather opening arrangement.

The present invention includes a replacement oil stick 15 having a longitudinal bore 16 which extends from the bottom thereof to a point adjacent the top thereof where it communicates with a fitting 17. The stick 15 is provided with a collar 18 which limits its inward movement through the boss 12 so that its lower end is normally positioned adjacent the bottom of the crankcase 11. The stick 15 is also provided with a longitudinal bore 19 which communicates with an opening 20 normally positioned in the upper portion of the crankcase 11 and above the level 21 of liquid lubricant contained therein. The bore 19 also communicates at its upper end with a fitting 22 adjacent the upper end of the stick 15.

Referring now to Figures 1 through 7, there is shown the gauge construction of the present invention which includes a bracket having a vertical arm 23 and an integrally formed horizontal arm 24 at the lower end thereof. Bolts 25 or the like are attached to the forward side of the arm 23 whereby the device may be attached to, for example, the far wall or instrument panel of the automobile with which the device is associated. A base plate 26 is affixed by bolts 27 or the like atop the arm 24.

Mounted upon the rearward end portion of the base plate 26 by bolts 28 or the like is a rearwardly extending intermediate body portion 29 having an upwardly and forwardly sloping rear face 30. A reservoir 31 having a cone-shaped bottom 32 is formed in the upper face of the intermediate body portion 29, and a conduit 33 extends from the bottom 32 to a diagonal conduit 34 which, in turn, communicates with an upwardly and forwardly extending passage 35 terminating in a socket 36 in which is positioned the lower end portion of an upwardly and forwardly extending gauge tube 37. A top body member 38 rests upon the intermediate body member 29 closing the upper end of the reservoir 31 and is provided with a forward extension 39 at its upper end. The forward extension 39 and the upper portion of the rear face of the top body member 38 are provided with a cover 40 which is affixed thereto by screws 41 or the like, and the rearward end of the cover 40 is provided with a recess 42 wherein is mounted an electric lamp 43 connected by a wire 44 to a suitable source of electrical energy (not shown).

Figure 3:
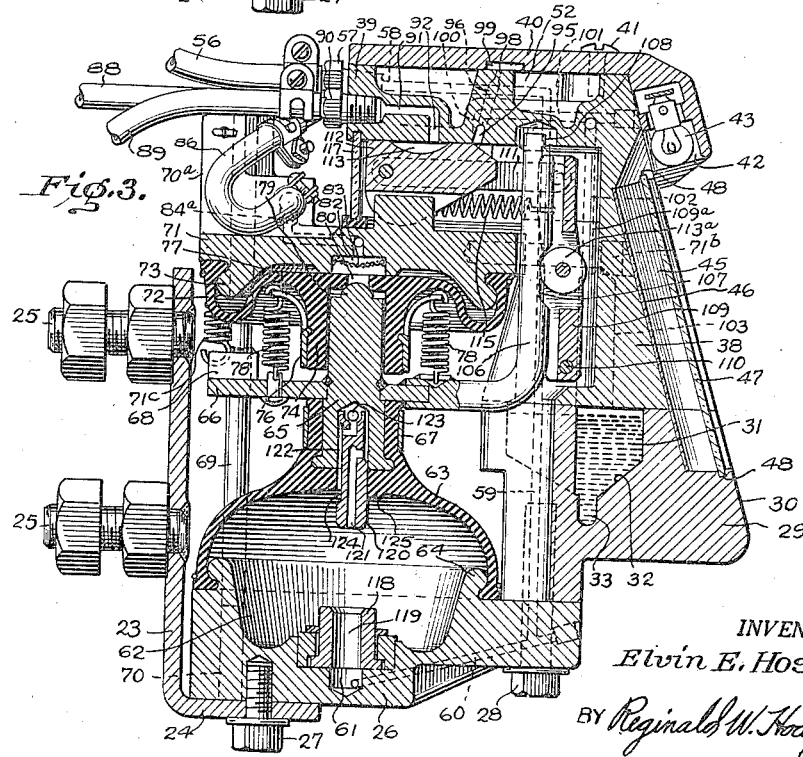
Figure 3 is a sectional view taken substantially along line 3—3 of Figure 2.

As will be seen, for example, in Figure 3, the upper portion of the intermediate body member 29 and the lower portion of the top body member 38 are provided with a continuously formed upwardly and forwardly extending recess 45 upon the back of which recess or chamber 45 is affixed by any suitable means a scale 46. As will be seen in Figure 2, the scale 46 is graduated to show, by reading the same with liquid in the member 37, the corresponding level in the crankcase 11.

A transparent cover plate 47 has its upper, lower, and one of its side edges arranged in suitable grooves 48 and is provided at one side thereof with a curved portion 49 which encompasses the tube 37 and which is provided with a suitable flange 50 which is affixed by screws 51 or the like to the body members 29 and 38.

A chamber 52 is provided in the upper face of the extension 39, and a passage 53 extends downwardly therefrom to communicate with a socket 54 which receives the upper end portion of the tube 37 therein.

The intake manifold 10 is provided with a fitting 55 to which one end of a conduit 56 is attached, the other end of the conduit 56 being connected to a fitting 57 in the forward end of the extension 39 and which communicates with a passage 58 which extends rearwardly and thence vertically downwardly, as indicated at 59, and thence forwardly and downwardly, as indicated at 60 to terminate in a centrally disposed well 61 centrally located in the plate 26 and within a diaphragm chamber 62 formed in the upper face of the plate 26. A lower diaphragm 63 is mounted upon an annular bead 64 also formed on the upper face of the plate 26 at the marginal edge of the chamber 62.

A support rod 65 extends vertically through and is welded to a horizontally extending operating plate 66, and the upper portion of the diaphragm 63 is secured to the lower portion of the rod 65 by means of a band 67.

A pair of corner lugs 68 are formed integrally with the forward end portion of the plate 66, and a pair of vertical guide rods 69 extend through and are affixed intermediate their ends to said lugs. The guide rods 68 have their lower ends slidably mounted in vertical bores 70 formed in the base plate 26 and likewise have their upper end portions slidably mounted in suitable openings 70ª through upstanding bosses 70ᵇ on an intermediate block member 71 spaced below the forward extension 39. The block member 71 has its rear end portion tightly fitted in a recess 71ª in the forward side of the upper body member 38 and is secured thereto by bolts 71ᵇ. A pair of compression springs 71ᶜ with their upper ends extending into other openings in the bosses 70ᵇ and connected to said bosses and with their lower ends connected to the lugs 68 exert an upward pull on the plate 66 at all times.

An upper diaphragm 72 is mounted upon a bead 73 formed on the underside of the block 71 and is provided with a central cylindrical portion 74 which is slidably mounted upon the upper portion of the rod 65 and which is surrounded by a ring 76 having a pair of upstanding hooks 77 each of which is connected by means of a tension spring 78 to the plate 66. The upper end of the rod 65 is provided with a rounded head 79 which is adapted to seat in a centrally disposed opening 80 in the diaphragm 72. The block 71 is provided with a recess 81 in its underside, and there is centrally provided in the recess 81 an opening 82 having a filter screen 83 mounted therein. A passage 84 with a ball check valve 84ª therein extends from the opening 82 through the block 71 to a fitting 85 which connects by a tube 86 to a Y fitting 87 connected to the forward end of the extension 39. The fitting 87 is also connected by a conduit 88 to the fitting 17 of the stick 15.

The fitting 22 is connected by a conduit 89 to a fitting 90 on the forward end of the extension 39, and the fitting 90 is connected by a passage 91 to a port 92 in the underside of the extension 39. The fitting 87 is connected by a passage 93 to a port 94 also in the underside of the extension 39. Another port 95 in the underside of the extension 39 connects by means of an upwardly extending passage 96 in an upward projection 97 in the upper face of the extension 39 and terminates in a restricted opening 98. The upper end of the projection 97 is in close proximity to the underside of the cover 40 and adjacent a recess 99 formed in the underside of such cover. Still another port 100 is formed in the underside of the extension 39 and communicates with a passage 101 which extends rearwardly and thence downwardly, as indicated at 102, to a chamber 103 formed in the lower end portion of the body member 38 and which chamber 103 communicates with the reservoir 31.

Secured on the rearward end of the plate 66 is a vertically extending arm 106 having a recess 107 in the central portion of the rearward face thereof and a recess 108 in the upper end portion of the rearward face thereof. A vertically extending lever 109 positioned in a recess 109ª in the forward side of the body member 38 is pivoted, at its lower end, as indicated at 110, to said body member 38 and is pivotally connected at its upper end by a pair of forwardly extending links 111 to a valve 112 which valve is provided with openings 113 in the upper face thereof and which openings 113 act to interconnect ports 94 and 100 and ports 92 and 95, respectively. A roller 113ª, revolvably mounted in the central portion of the lever 109, bears against the arm 106, and engagement thereof in and out of the recesses slides the valve 112. Tension springs 114 interconnect the lower portion of the valve 112 with the underside of the extension 39 to maintain such valve 112 in sliding engagement with the underside of the extension 39, and a pair of tension springs 115 interconnect the upper end of the lever 109 with ears 116 affixed to the upper side of the block 71. A transparent closure plate 117 is interposed between the upper side of the block 71 and the underside of the extension 39 and encompasses the valve 112 and springs 114 and 115 to keep foreign matter from entering the enclosure and interfering with operation of the valve.

Fixed atop the base plate 26 is a slightly shiftable collar 118 having chamfered central opening 119 formed therein which opening registers with the well 61. A cylindrical valve body 120 also chamfered at its end is affixed within the lower end portion of the rod 65 and extends downwardly into the diaphragm 63. A passage 121 extends centrally from the lower end of the body 120 upwardly into the interior thereof where it communicates with a downwardly extending passage 122. A ball check valve 123 interconnects the passages 121 and 122. The lower end of the passage 122 terminates in a port 124 in the side of the body 120 immediately within the diaphragm 63, and the diaphragm 63 is provided with a downward projection 125 adjacent the body 120 upon the side thereof opposite to that which contains the port 124. The body members 29 and 38 are fastened together with screws 127 or the like.

Operation

Figures 1 through 7, the device is shown in the position it will eventually assume after the motor has stopped running and the device has completed its operation. In this position, the device may be termed to be "at rest." When, however, the motor or engine with which the device is associated begins to operate, vacuum will be applied from the intake manifold 10 through the conduits and passages 56, 58, 59, and 60 to the well 61, thus causing an evacuation of the chamber 62 and thus causing a closing of the diaphragm 63. This action causes a downward movement of the center portion of the diaphragm and brings the valve body 120 downwardly into the opening 119 until the projection 125 impinges against the upper edge of the collar 118, thus leaving the port 124 in communication with the interior of the diaphragm. This position of the device is illustrated diagrammatically in Figure 9 of the drawings. It will be apparent that the diaphragm 63 will be maintained in this lowermost position since vacuum will be continued to be applied through the passages 121 and 122 to the interior of the diaphragm, the check valve 123 not hindering such action. During the downward movement just described, it will be apparent that the plate 66 and consequently the arm 106 will likewise be brought downwardly since the rod 65 interconnects the plate 66 with the diaphragm 63. Again, it must be pointed out that this downward action of the plate 66 opens the valve 80 in the diaphragm 72 and at the same time cams the valve 112 to the right and then allows the valve to move to the left to take the position shown, for example, in Figure 3 due to the action of the springs 115 urging the lever 109 to the left, the roller 126 eventually engaging in the recess 108, as shown in Figure 9. The movement of the valve first to the right and then to the left has no purpose during the downward movement. This whole downward movement just described takes place against the action of the springs 71c and 78 and, as aforestated, the continued running of the engine will act to maintain the device in this position illustrated diagrammatically in Figure 9.

When, however, the engine is shut off, it will be apparent that a partial vacuum will no longer exist in the intake manifold 10 and hence, air will be allowed to move into the diaphragm 63 through the conduits and passages 56, 58, 59, and 60, the well 61, and opening 119. This movement of air into the chamber 62 is impeded by the check valve 123 and hence, air can only enter the chamber 62 around the periphery of the valve body 120 while said body 120 remains within the opening 119. This is a slow movement, and, in actual practice, has been found to take approximately fifteen seconds which has been found to be a sufficient time to allow the oil 21 in the crankcase to assume a stable level before starting to take a reading as will be hereinafter set forth. As air is thus applied to the interior of the diaphragm 63, as diagrammatically represented in Figure 8, it will be apparent that the springs 78 will act to immediately close the valve 80 in the diaphragm 72, while at the same time, the springs 71c will act to lift the plate 66 and the arm 106. The upward movement of the arm 106 will act to first move the roller 113a out of its engagement in the recess 108, thus moving the lever 109 in a clockwise direction as viewed, for example, in Figure 8, and thus, through the links 111 to move the valve 112 to the right, likewise as viewed in Figure 8. This action interconnects, by means of the passages 113 in the valve 112, the port 94 with the port 100, and at the same time, the port 92 with the port 95. Continued upward movement of the diaphragm 72 will now apply air under pressure past the check valve 84a and through the conduit 86. This pressure is applied through the passage 93, ports 94 and 100 and passages 101 and 102 to the chamber 103 and hence to the top of the body of liquid in the reservoir 31. It will also apply air pressure through the conduit 88 to the passage 16 in the stick 15, thus forcing liquid contained therein downwardly and out of the bottom of such stick 15. It will therefore be readily apparent that the hydrostatic head of the liquid 21 will be registered by the height of liquid forced upwardly in the tube 37 since, while these actions are taking place, the pressure above the column of liquid in the tube 37 is equalized with the pressure above the liquid 21 in the crankcase 11 through port 20, passage 19, conduit 89, port 92, the valve 112, the passage 96, port 98, and the chamber 52 which communicates with the upper end of the tube 37.

The arm 106 and its attached mechanisms continue to rise, pressure from the diaphragm 62 will continue to be applied as aforesaid, and a reading may continuously be taken in the manner above described, reading the height of the liquid in the tube 37 with the indicia upon the plate 46. This action continues until the roller 126 moves into the recess 107 in the arm 106, thus allowing the springs 115 to again move the valve to the left, as viewed in Figure 8 and thus opening the ports 95 and 100 to the atmosphere and bringing the device back to its original position as illustrated in Figure 3.

The venting of the ports 95 and 100 to the atmosphere allows the elevated liquid in the tube 37 to rapidly resume its normal level, and it is at such time that a reading of the gauge terminates. This quick return of the liquid to its normal level relieves to a great extent the likelihood of reading the gauge during the return, thus obtaining an inaccurate reading. Actual practice has shown that the gauge reading is available for approximately thirty seconds.

It is pointed out that when the engine is again started to thus move the device to its position in Figure 9, the valve 80 is first opened against the action of the springs 78 by vacuum under the diaphragm 72, thus allowing air to fill the interior of the diaphragm 72, it being apparent that the upper portion of the rod 65 is loosely mounted in the cylindrical portion 74 of the diaphragm 72.

It is also pointed out that when quickly accelerating an engine, suction in the manifold 10 decreases considerably, and that in order to prevent the starting of an operation of the gauge at such short intervals of abnormal suction, vacuum under the diaphragm 63 is utilized to delay operation past the usual period of time until normal suction is again restored. This is accomplished by the previously mentioned restricted passage between the wall of the bore 119 and the wall of the cylindrical valve body 120 during protrusion of the body into the bore.

While I have herein described a specific form which the invention may take, it will be understood that changes and modifications may be made by those skilled in the art which still fall within the spirit and scope of the appended claims.

What is claimed is:

1. A device of the character described comprising a gauge body, a pair of conduits extending from said body to the crankcase of an engine, one of said conduits communicating with a port in said body and with the interior of the crankcase below the level of liquid contained therein, the other of said conduits being in communication with another port in said body and with the interior of the crankcase above the liquid level, a substantially vertically extending tube visibly mounted in said body, said body having a colored fluid reservoir therein and a passage interconnecting the lower end of said reservoir and the lower end of said tube, a sliding valve in said body interconnecting the ports in said body respectively with the upper ends of said reservoir and said tube, a slide vertically movable in said body, a lower diaphragm affixed to said slide and said body and with said body providing a diaphragm closed chamber, a well in the lower end of said body and within said chamber, a cylindrical valve depending from said slide and within said diaphragm closed chamber and slidably receivable in said well, a conduit interconnecting the body with a source of suction on the engine, said body having passages interconnecting said last-mentioned conduit and said well, an upper diaphragm mounted on said body above and operated by said slide and with said body providing an upper diaphragm chamber, means associated with said upper diaphragm chamber for applying pressure from said chamber to the upper portions of said reservoir and said crankcase upon the opening of said sliding valve, and means operable by movement of said slide for opening and closing said sliding valve.

2. A device as defined in claim 1 wherein said last-mentioned means includes a vertically extending lever pivotally mounted at its lower end in said body, a roller revolvably mounted in the central portion of said lever and extending outwardly therefrom, a vertical arm affixed to said slide adjacent to said lever and having an upper recess and a lower recess formed in that side thereof adjacent said lever, said roller bearing against said arm and receivable in said recesses, links interconnecting the upper end of said lever and said sliding valve, and tension springs interconnecting said lever and said body and urging said sliding valve to closed position.

3. A device as defined in claim 1 wherein said cylindrical valve includes a passage extending upwardly from the lower end thereof, a port in one side thereof adjacent the body of its associated diaphragm, a second passage extending upwardly from said port, and a ball check valve interconnecting said passages.

4. A device as defined in claim 3 further characterized by the provision of a partial shoulder formed in the diaphragm on that side of the valve body opposite to said port.

5. A device as defined in claim 1 wherein said upper diaphragm is provided with a centrally disposed dependent cylindrical portion having a valve opening in the upper end thereof, wherein an upstanding cylindrical rod with a valve head formed on the upper end thereof is carried by said slide, said rod being loosely receivable in said dependent cylindrical portion, and wherein at least one tension spring interconnects said depending cylindrical portion of said upper diaphragm with said slide, said head by action of said tension spring being adapted to close said valve opening upon upward movement of said slide.

6. A device as defined in claim 1 characterized by the provision of a centrally disposed dependent cylindrical portion on said upper diaphragm and having a valve opening in the upper end thereof, an upstanding cylindrical rod with a valve head formed on the upper end thereof carried by said slide, said rod being loosely receivable in said dependent cylindrical portion, said valve head being adapted to close said valve opening upon upward movement of said slide, a ring mounted on said dependent cylindrical portion of said diaphragm, a pair of upstanding hooks affixed to said ring, and a pair of tension springs interconnecting said hooks with said slide.

7. A device as defined in claim 6 further characterized by the provision of a pair of tension springs interconnecting said slide and the upper portion of said body.

8. In an internal combustion engine and a liquid container therefor, the combination of a pressure responsive gauge for said container, a pressure conveying conduit extending from said gauge and downwardly into the liquid in the container, a pair of diaphragm closed chambers, a slide connected to the diaphragms of both chambers for expanding one diaphragm closed chamber during the collapsing of the other, fluid passage means communicating the interior of one of the diaphragm closed chambers with the interior of a suction creating element of the engine for moving the slide in one direction, other fluid passage means communicating the interior of the other diaphragm closed chamber with said pressure conveying conduit, spring means for moving said slide in the other direction upon the ceasing of a suction to apply air pressure to said gauge, and means for retarding the action of said spring means upon the ceasing of suction, said retarding means including a cylindrical well in the suction operated diaphragm closed chamber and in communication with said fluid passage, a cylindrical valve body movable with said slide and slidably receivable in said well whereby air is admissible to the interior of said last-mentioned diaphragm closed chamber only around said valve body while said valve body is within said well.

9. A device as defined in claim 8 wherein said valve body has a passage therethrough, and wherein a check valve normally closes said passage and is opened during the collapsing of the suction operated diaphragm closed chamber.

References Cited in the file of this patent
UNITED STATES PATENTS

| | | |
|---|---|---|
| 1,241,384 | Hueber | Sept. 25, 1917 |
| 1,657,330 | Winslow | Jan. 24, 1928 |
| 1,698,701 | Smithe | Jan. 8, 1929 |
| 2,653,477 | Hoskins | Sept. 29, 1953 |